June 15, 1965  D. L. HERBERT  3,189,190
COUPLER CENTERING DEVICE
Filed Jan. 2, 1964  2 Sheets-Sheet 1

INVENTOR.
DONALD L. HERBERT
BY
ATTORNEY

INVENTOR.
DONALD L. HERBERT
BY Kenneth W. Miller
ATTORNEY 3,189,190
COUPLER CENTERING DEVICE
Donald L. Herbert, Mansfield, Ohio, assignor to The Ohio Brass Company, Mansfield, Ohio, a corporation of New Jersey
Filed Jan. 2, 1964, Ser. No. 335,245
6 Claims. (Cl. 213—21)

This application relates to centering apparatus for vehicular couplers.

A principal object of the invention is to provide apparatus for locking and holding a car coupler in the neutral or center position.

Another object of the invention is to provide a centering apparatus for railroad cars which functions under different operating conditions imposed by associated switching apparatus.

Still another object of the invention is to combine coupler centering apparatus with the associated electrical and/or pneumatic train systems.

A specific object of the invention is to facilitate coupling operations in railroad cars and to prevent damage to coupler equipment.

In accordance with the invention, a car coupler is mounted upon a railroad car by means of a pivotal or center mount at the interior end of the coupler and by a sector bar at the outer end of the conupler. The coupler housing is provided with flanges which overlap the sector bar and ride upon the sector bar to permit relative angular movement of the coupler with respect to the car during cornering or other angling movement thereof. The centering apparatus described herein comprises a spring held plunger which is mounted upon the car and is forced into a detent on the coupler to prevent sideward movement when the coupler reaches the center or axial position of the car. Withdrawal of the plunger is controlled by a cam and lever arrangement which is coupled to an intercar line switch. Operation of the switch and plunger cam is accomplished by handles arranged at the sides of the car.

Operation of the centering apparatus is such that the plunger is withdrawn whenever the line switch is moved to the closed position, and the car coupler is free to move in either direction from the center position. When uncoupling cars the handle is moved to the open position, and the plunger locks and holds the car coupler in the center position of the car whenever the coupler reaches that position. However, the plunger has the head so shaped in relation to its position when released that strong sideward movements or pressures exerted by the coupler carry the plunger out of or past the detent opening in the coupler. This may be necessary if cars still coupled together must be electrically isolated from one another due to electrical difficulties. Accordingly, the centering device will perform its intended function as to normal positioning of the coupler in the center position, but will accommodate swinging movement of the coupler even though the line switch is in the open position.

The invention, together with the objects, features, and advantages thereof, will be evident from the following detailed description, taken in connection with the appended drawings in which.

Figure 1:
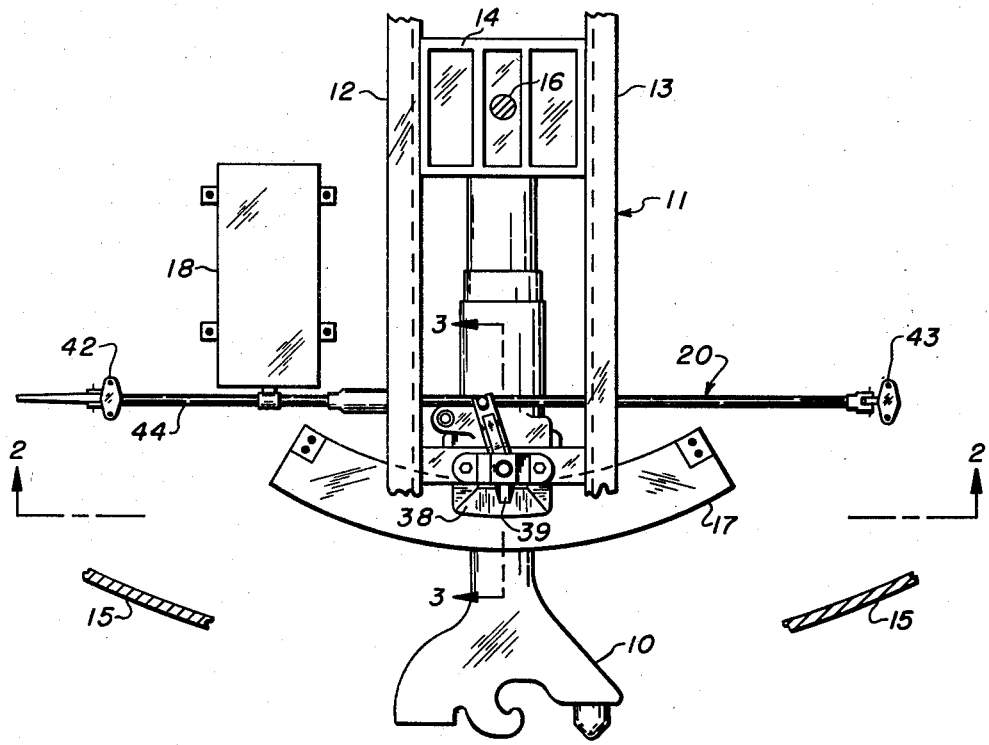
FIG. 1 is a plan view illustrating the centering apparatus of the invention with the associated coupler, sector bar, and line switch thereof.

Referring to FIG. 1, a car coupler 10 is shown with a railroad car 11, illustrated schematically as two sills 12 and 13, a cross plate or anchor 14, and front end 15. The coupler 10, for example, the coupler of United States Patent 2,802,581, is carried on the underside of the car 11 by means of the cross plate 14, a pivot pin 16 and a sector bar 17 secured to the under frame of the car adjacent the front end 15 thereof. An intercar line switch, such as an electric switch 18, is mounted on the underside of the car in transversely spaced relation to the coupler 10. Centering apparatus 19 is mounted on the sills 12 and 13, and operating means 20 interconnects the switch 18 and the centering apparatus 19 for simultaneous operation thereof.

The centering apparatus 19 comprises a locking mechanism 22 including a plunger 23, a spring 24, a support frame 25, an operating cam 26, and an operating lever 27. The support frame 25 is carried from a cross bar 28 of the car frame by means of two bolts 29 and 30 which extend through the cross arms 31 and 32 of the frame 25.

The plunger 23 comprises a bolt 33 which extends through an opening in the cross bar 28, a shank 34 which extends through an opening in the yoke 35 of the support frame 25, and an integral flange 36 which has the axial surface shaped to conform to and cooperate with the cam surface of the operating cam 26. The plunger 23 is arranged for sliding movement between the cross bar 28 and the yoke 35, the locking end 37 of the plunger 23 being extended into or retracted from locking engagement with a locking member 38 carried by the coupler 10 above the sector bar 17. Cooperative movement of the operating cam 26 against the flange 36 and the spring 24 is accomplished by rotary movement of the lever 27 actuated by the operating means 20.

Unlocking movement of the lever 27 and corresponding rotary movement of the cam 26 forces the plunger 23 upward and away from the coupler 10 by reason of the interfering engagement of the cam 26 with the flange 36. The plunger 23 is moved upward against the spring 24 so that the end 37 of the bolt 33 is disengaged from the member 38. Conversely, return movement of the lever 27 and corresponding rotary movement of the cam 26, so that the cam surfaces of the cam 26 and the flange 36 are brought into conforming relation, lowers the plunger 23 downward under the force exerted by the spring 24. In the latter position, the end 37 of the bolt 33 is received in the locking opening or detent 39 of the plate or rides upon the adjacent surface of the plate 38.

The bolt 33 has a square cross section and the opening in the cross bar 28 conforms to the exterior of the bolt to restrain the plunger 23 against turning movement with the cam 26 and lever 27. The locking member 38 may be formed as an integral part of the sector flange of the coupler or as a separate plate fixed to the coupler housing or sector flange. The locking member comprises transversely spaced parts defining a locking opening 39 which receives the end 37 of the bolt 33. The transverse interior and exterior sides of the parts of the locking member are formed with a taper, for example, 30 degrees from the vertical, to cooperate with the tapered end part of the bolt 33 and permit swinging movement in the circumferential direction of the coupler, against the bolt 33.

Figure 2:
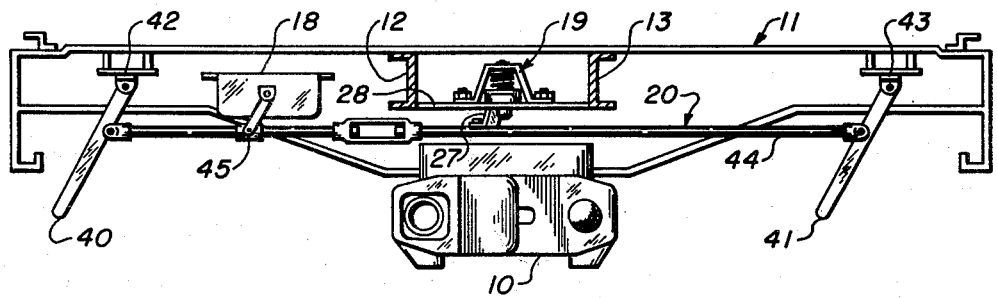
FIG. 2 is a front elevation view of the apparatus of FIG. 1, taken in the direction 2—2 of FIG. 1.
Figure 4:
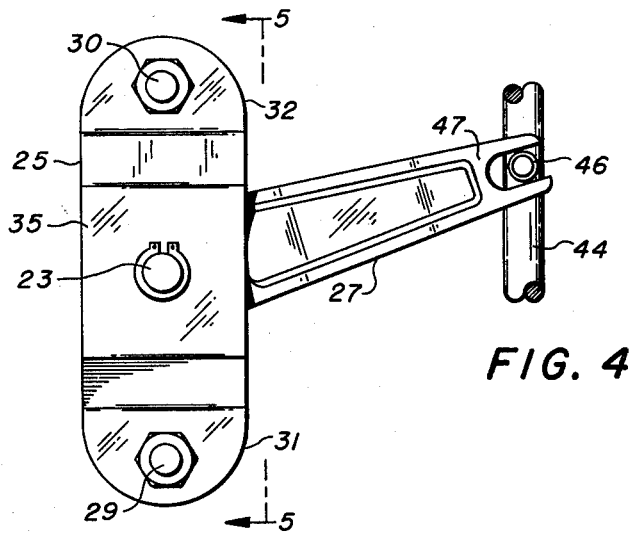
FIG. 4 is a top plan view of the apparatus of FIG. 3.
Figure 3:
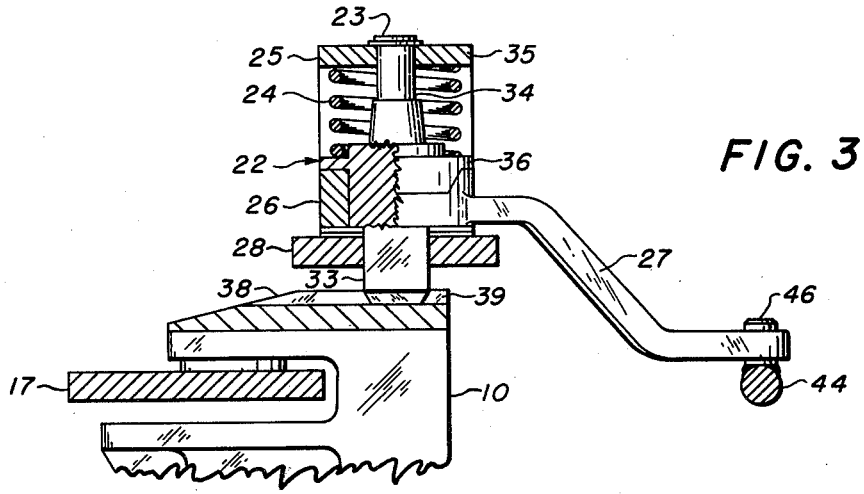
FIG. 3 is a side elevation view, partly in section, of the apparatus of FIG. 1 and FIG. 2, particularly illustrating the plunger and lever of the centering apparatus.
Figure 5:
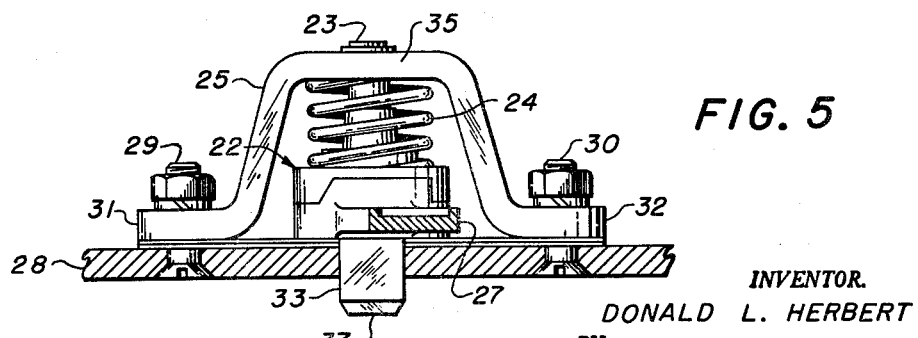
FIG. 5 is an elevation view, taken in the direction 5—5 in FIG. 4.

The operating means 20 includes two operating handles 40 and 41 pivotally supported from the frame of the car 11 by two brackets 42 and 43. A cross rod 44 is connected to the handles 40 and 41 by suitable pin and link arrangements for support of the cross rod on the handles and lateral movement transversely of the car with movement of the handles 40 and 41. The cross rod 44 is connected to the electric switch 18 by a suitable link and lever mechanism 45 (FIG. 2) and is connected to the operating lever 27 by means of a pin 46 extending upwardly from the rod 44 and a yoke 47 formed at the extremity of the operating lever 27 (FIG. 3 and FIG. 4). Lateral movement of the handles 40 and 41 results in turning movement of the mechanism 45 about the shaft of the electric switch 18 to open and close the car line and turning movement of the operating lever 27 to retract or return the plunger 23 from or into engagement with the coupler plate 38.

The cooperative movement of the parts of the centering apparatus 19 and the electric switch 18 by the operating mechanism 20 is such that when the operating mechanism 20 is moved transversely to the left by the operating handles 40 and 41 (FIG. 1 and FIG. 2) the plunger 23 is in the extended position and the line switch 18 is open. In this position, the bolt 33 engages the locking member 38 of the coupler 10 and holds the coupler in the center position in alignment with the longitudinal axis of the car. Accordingly, the coupler may be swung in any direction on the sector bar 17 and the car may be coupled to or uncoupled from other cars for yard operations.

Conversely, when the operating mechanism 20 is moved transversely to the right by the operating handles 40 and 41 (FIG. 1 and FIG. 2) the plunger 23 is in the retracted position and the line switch 18 is closed. In this position, the bolt 33 is disengaged from the member 38 and the coupler 10 is free to swing in either direction from the center position in alignment with the longitudinal axis of the car. This position is the normal running position of the car when coupled with other cars in a train.

In the condition first described, that is with the line switch open and the plunger in the locking position, the coupler 10 may swing through the center position or be forced from the center position without damage to the centering and coupling apparatus. This functioning results from the fact that the end part 37 of the bolt 33 engages the locking member 38 along tapered faces at the extremity of the bolt 33 and along the opening 39 of the locking member 38. Accordingly, a sufficient transverse force applied to the coupler 10, such as might be exerted when two cars are coupled in the off center position, on a curve or the like, will force the plunger into the retracted position to permit aligning movement of the couplers.

In alternate embodiments of the invention, the electric switch 18 is replaced by pneumatic or hydraulic valves as comprehended by the term, intercar line switch, used in the claims.

It is to be understood that the foregoing description is not intended to restrict the scope of the invention and that various rearrangements of the parts and modifications of the design may be resorted to. The following claims are directed to combinations of elements which embody the invention or inventions of this application.

I claim:

1. Coupler apparatus comprising a mechanical coupler pivotally mounted on a car, a sector bar supporting the outer end of the coupler for swinging movement thereon with flange means on the coupler riding on the top side of the said sector bar, and a detent member on the coupler below the sector bar, a locking mechanism mounted on the car above the sector bar on the longitudinal axis of the car and defining a center position for the coupler, the said locking mechanism including a plunger, a spring for urging the plunger into an extended position, and a cam for withdrawing the plunger from the forward extended position, operating means for the said cam pivotally mounted on the said car comprising a mechanical lever, an intercar line switch mounted on the said car, and a two-position operating mechanism operatively connecting the said switch and the said lever, whereby when the operating mechanism is in one position the line switch is closed and the plunger is withdrawn for free swinging movement of the coupler, and in the remaining position the line switch is open and the plunger is released for holding the coupler in the center position.

2. Coupler apparatus in accordance with claim 1, in which the plunger has a tapered end part and in its released position engages the detent member along the tapered portion thereof for permitting sidewise travel of the coupler against the plunger.

3. A centering device for vehicular couplers in which the couplers pivot about a fixed center, comprising fixed transversely extending members disposed adjacent the path of movement of a coupler, a plunger comprising a bolt and a shank extending between and through the said members respectively, a flange on the plunger and a spring coaxially about the plunger operatively engaged with a first one of the members for urging the plunger toward the remaining one of the members, and a cam surface on the flange, cam means having a cam surface complementary to and engaged with the cam surface on the said flange, and an operating lever for actuating the said cam means for extension and retraction of the plunger into and through the said second member.

4. A centering device in accordance with claim 3 and in combination therewith, a locking member for a coupler adapted to be attached to the coupler for movement along the said second member on the side thereof exteriorly of the said two members, the locking plate having an opening for receiving the bolt end of the plunger, the said bolt having the side walls tapered inward at the extremity thereof for operation of the plunger upon forced sideward movement of the locking plate.

5. A centering device in accordance with claim 3 and in combination therewith, an operating mechanism comprising a transversely extending bar arranged for linear movement thereof, and an operating lever having the ends thereof coupled to the cam means and to the bar, and a fixed pivot for the operating lever and the cam means.

6. Apparatus in accordance with claim 5 and in combination therewith, a line switch coupled to the said bar for turning the line switch to an open position when the plunger is extended and to a closed position when the plunger is retracted.

References Cited by the Examiner
UNITED STATES PATENTS 2,336,948 12/43 Mitzger _____ 213—21
3,108,697 10/63 Mitzger _____ 213—21

LEO QUACKENBUSH, *Primary Examiner.*